US011942718B2

(12) United States Patent
Wang

(10) Patent No.: US 11,942,718 B2
(45) Date of Patent: Mar. 26, 2024

(54) ASSEMBLED TYPE WATERPROOF MALE AND FEMALE PLUG FOR STRING LIGHT CONNECTION

(71) Applicant: Guangdong Guanyi Lighting Co., LTD., Shaoguan (CN)

(72) Inventor: Shifang Wang, Dongguan (CN)

(73) Assignee: GUANGDONG GUANYI LIGHTING CO., LTD., Shaoguan (CN)

( * ) Notice: Subject to any disclaimer, the term of this patent is extended or adjusted under 35 U.S.C. 154(b) by 0 days.

(21) Appl. No.: 18/299,424

(22) Filed: Apr. 12, 2023

(65) Prior Publication Data

US 2023/0246380 A1 Aug. 3, 2023

(30) Foreign Application Priority Data

Apr. 20, 2022 (CN) ......................... 202220919560.7

(51) Int. Cl.

| | |
|---|---|
| ***H01R 13/52*** | (2006.01) |
| ***F21V 21/005*** | (2006.01) |
| ***F21V 23/06*** | (2006.01) |
| ***F21V 31/00*** | (2006.01) |

(52) U.S. Cl.

CPC ....... *H01R 13/5216* (2013.01); *F21V 21/005* (2013.01); *F21V 23/06* (2013.01); *F21V 31/005* (2013.01)

(58) Field of Classification Search

CPC .............. H01R 13/5216; H01R 13/622; H01R 13/5205; H01R 13/506; F21V 21/005; F21V 23/06; F21V 31/005; F21S 4/10

See application file for complete search history.

(56) References Cited

U.S. PATENT DOCUMENTS

| | | | | | |
|---|---|---|---|---|---|
| 5,676,565 | A * | 10/1997 | Vagnoni | H01R 24/56 | 439/580 |
| 6,367,952 | B1 * | 4/2002 | Gibboney, Jr. | F21V 19/0005 | 362/249.05 |
| 7,094,111 | B1 * | 8/2006 | Qingbiao | H01R 13/506 | 362/653 |
| 7,270,468 | B2 * | 9/2007 | Lin | F21V 19/0005 | 439/619 |
| 7,291,045 | B2 * | 11/2007 | Wu | F21V 23/008 | 439/660 |
| 11,493,198 | B2 * | 11/2022 | Loomis | F21V 17/12 | |
| 2004/0150998 | A1 * | 8/2004 | Fan | H01R 13/5219 | 362/267 |
| 2005/0176265 | A1 * | 8/2005 | Jacobs | H01R 13/502 | 439/35 |

(Continued)

*Primary Examiner* — Tsion Tumebo
(74) *Attorney, Agent, or Firm* — Zhigang Ma

(57) ABSTRACT

The present disclosure relates to the technical field of string light sockets, and discloses an assembled type waterproof male and female plug for string light connection. The assembled type waterproof male and female plug includes a first electrical wire and a second electrical wire; the first electrical wire is provided with a male connector; the second electrical wire is provided with a female connector; the male connector and the female connector can be plugged to each other; the male connector includes a first assembly part and a second assembly part; the first assembly part is provided with a first conductive terminal group; and the first conductive terminal group is provided with at least two plugging ends for connecting the female connector.

11 Claims, 13 Drawing Sheets

(56) References Cited

U.S. PATENT DOCUMENTS

| | | | | |
|---|---|---|---|---|
| 2006/0039146 | A1* | 2/2006 | Wu | F21V 23/04 362/235 |
| 2015/0077998 | A1* | 3/2015 | Zhang | F21V 23/06 362/249.04 |
| 2015/0126059 | A1* | 5/2015 | Zhao | H01R 33/9651 439/519 |
| 2021/0036491 | A1 | 2/2021 | Kawashima | |
| 2021/0036492 | A1 | 2/2021 | Sumoyama et al. | |
| 2022/0360052 | A1 | 11/2022 | Nakano et al. | |

* cited by examiner

ASSEMBLED TYPE WATERPROOF MALE AND FEMALE PLUG FOR STRING LIGHT CONNECTION

TECHNICAL FIELD

The present disclosure relates to the technical field of string light sockets, in particular to an assembled type waterproof male and female plug for string light connection.

BACKGROUND

Lamps are the general name of lighting tools. With the development of science and technology, various lamps begin to appear in people's lives. Functions of lamps are no longer limited to lighting, but more to meet needs of consumers. Lamps also have a decoration function. According to different use functions, lamps can be roughly divided into: household lighting, commercial lighting, industrial lighting, road lighting, landscape lighting, and the like.

Both ends of a string light need to be provided with male and female plugs to connect another string light or a power supply. However, the existing male and female plugs usually need to be made by specific injection molding equipment. A production process of the male and female plugs is cumbersome, resulting in high production cost and a failure to meet production requirements. On the other hand, the existing male and female plugs have poor waterproof performance. Especially in engineering string lights, the safety and stability of the string light are low. In order to solve the above problems, the inventor has made a new invention.

SUMMARY

For the shortcomings in the prior art, the present disclosure aims to provide an assembled type waterproof male and female plug for string light connection, which has the characteristics of low cost, good waterproof performance and high security.

In order to achieve the above objective, the present disclosure provides an assembled type waterproof male and female plug for string light connection, including a first electrical wire and a second electrical wire; the first electrical wire is provided with a male connector; the second electrical wire is provided with a female connector; the male connector and the female connector can be plugged to each other; the male connector includes a first assembly part and a second assembly part; the first assembly part is provided with a first conductive terminal group; the first conductive terminal group is provided with at least two plugging ends for connecting the female connector; the first assembly part and the second assembly part are spliced with each other to form a first cavity; the first electrical wire extends into the first cavity; the first electrical wire is electrically connected to the first conductive terminal group; the female connector includes a third assembly part and a fourth assembly part; the third assembly part is provided with a second conductive terminal group; the second conductive terminal group is provided with contact ends electrically connected to the plugging ends; the third assembly part and the fourth assembly part are spliced with each other to form a second cavity; the second electrical wire extends into the second cavity; and the second electrical wire is electrically connected with the second conductive terminal group.

Preferably, first sealing members are arranged at end portions of the first assembly part and the second assembly part; a first protective shell further sleeves the first assembly part and the second assembly part; and a first annular platform portion for fixing the first sealing members is arranged at a bottom of the first protective shell.

Further, a plurality of first protrusions are arranged outside each of the first assembly part and the second assembly part; a plurality of second protrusions are arranged inside the first protective shell; and the first protrusions and the second protrusions are clamped to each other.

Preferably, second sealing members are arranged at end portions of the third assembly part and the fourth assembly part; a second protective shell further sleeves the third assembly part and the fourth assembly part; and a second annular platform portion for fixing the second sealing members is arranged at a bottom of the second protective shell.

Further, a plurality of third protrusions are arranged outside each of the third assembly part and the fourth assembly part; a plurality of fourth protrusions are arranged inside the second protective shell; and the third protrusions and the fourth protrusions are clamped to each other.

Further, the first assembly part includes a first assembling portion, a first connecting portion and a first cylindrical portion which are connected in sequence; first clamping portions are arranged on two sides of the first assembling portion; the second assembly part is provided with first buckling portions clamped to the first clamping portions; the first cylindrical portion is provided with an accommodating chamber; and limiting holes for mounting the plugging ends are formed in the accommodating chamber.

Much further, the first conductive terminal group includes a first conductive terminal and a second conductive terminal; one end of each of the first conductive terminal and the second conductive terminal is provided with a first pointed convex portion for being electrically connected to the first electrical wire; the first pointed convex portion is arranged at the first assembly part; the other end of each of the first conductive terminal and the second conductive terminal is provided with each plugging end; and the plugging ends pass through the first connecting portion and are mounted in the limiting holes.

Further, the third assembly part includes a second assembling portion, a second connecting portion and a second cylindrical portion which are connected in sequence; second clamping portions are arranged on two sides of the second assembling portion; the fourth assembly part is provided with second buckling portions clamped to the second clamping portions; the second cylindrical portion is internally provided with a mounting portion matched with the accommodating chamber; and mounting holes for mounting the plugging ends are formed in the mounting portion.

Much further, the second conductive terminal group includes a third conductive terminal and a fourth conductive terminal; one end of each of the third conductive terminal and the fourth conductive terminal is provided with a second pointed convex portion for being electrically connected to the second electrical wire; the second pointed convex portion is arranged at the second assembly part; the other end of each of the third conductive terminal and the fourth conductive terminal is provided with each contact end; and the contact ends pass through the second connecting portion and are mounted in the mounting holes.

Preferably, the assembled waterproof male and female plug for lamp string connection further includes a locking nut for fixedly connecting the male connector to the female connector; a locking thread is formed outside the second cylindrical portion; and the locking thread is in threaded connection with the locking nut.

Beneficial effects: Compared with the prior art, the present disclosure discloses an assembled type waterproof male and female plug for string light connection. The assembled type waterproof male and female plug includes a first electrical wire and a second electrical wire; the first electrical wire is provided with a male connector; the second electrical wire is provided with a female connector; the male connector and the female connector can be plugged to each other; the male connector includes a first assembly part and a second assembly part; the first assembly part is provided with a first conductive terminal group; and the first conductive terminal group is provided with at least two plugging ends for connecting the female connector. The present disclosure has the following advantages: 1. The male and female plug is of an assembled type structure, so that it is not necessary to use specific injection molding equipment to produce male and female plugs, which simplifies the production flow and effectively reduces the production cost. 2. The male and female plug is high in waterproof performance, which greatly improves the safety and stability of a product. 3. The male and female plug is simple in structure and high in assembling efficiency, can be assembled manually or automatically on a large scale, without being limited by environments, and is more convenient to use.

Figure 1:
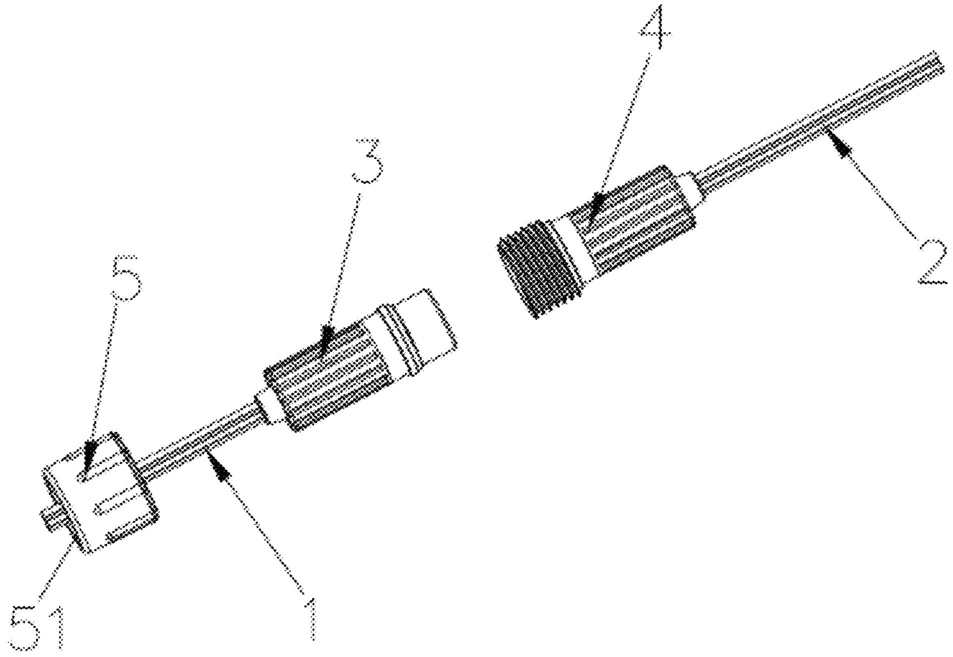
FIG. 1 is a schematic three-dimensional diagram of the present disclosure.

REFERENCE NUMERALS INCLUDE first electrical wire 1, second electrical wire 2, male connector 3, first assembly part 31, first assembling portion 311, first connecting portion 312, first cylindrical portion 313, first clamping portion 314, accommodating chamber 315, limiting hole 316, first locating slot 317, annular clamping portion 318, second assembly part 32, first buckling position 321, first conductive terminal group 33, plugging end 331, first conductive terminal 332, second conductive terminal 333, first pointed convex portion 334, first cavity 34, first sealing member 35, first protective shell 36, first annular platform portion 361, second protrusion 362, first protrusion 37, female connector 4, third assembly part 41, second assembling portion 411, second connecting portion 412, second cylindrical portion 413, second clamping portion 414, mounting portion 415, mounting hole 416, locking thread 417, second locating slot 418, fourth assembly part 42, second buckling position 422, second conductive terminal 43, contact end 431, third conductive terminal 432, fourth conductive terminal 433, second pointed convex portion 434, second cavity 44, second sealing member 45, second protective shell 46, second annular platform portion 461, fourth protrusion 462, third protrusion 47, locking nut 5, third annular platform portion 51, wire slot 6, first waterproof ring 7, second waterproof ring 8, locating block 9, third locating slot 10, and a sealing ring 11.

DETAILED DESCRIPTION OF THE EMBODIMENTS

Figure 2:
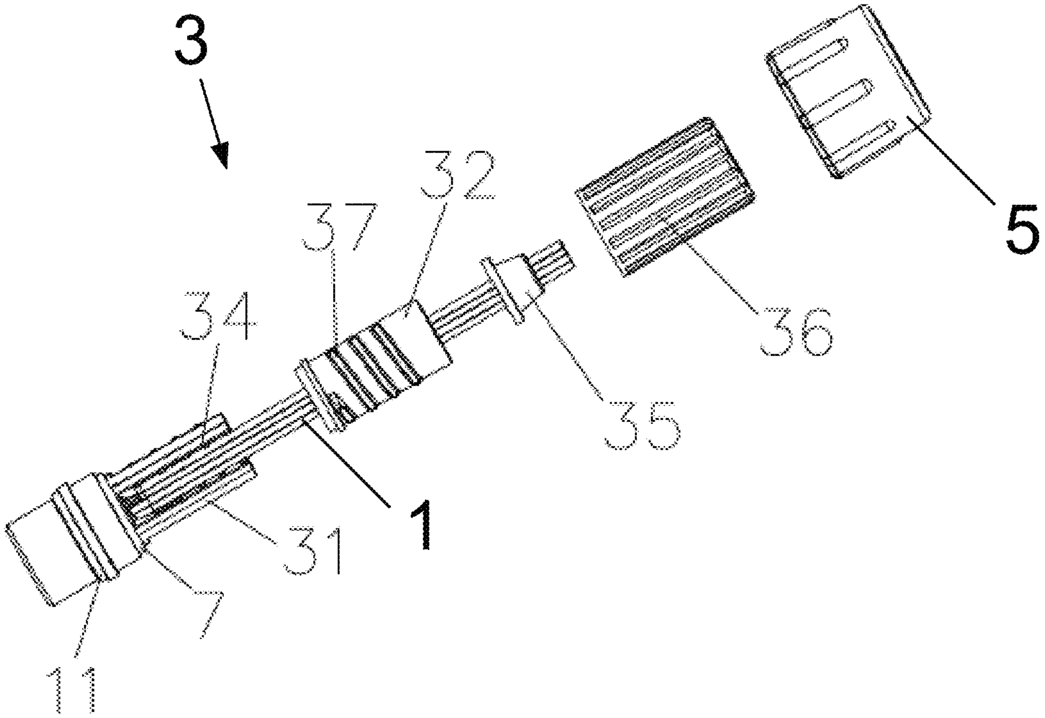
FIG. 2 is a schematic diagram of an exploded structure of a male connector of the present disclosure.
Figure 3:
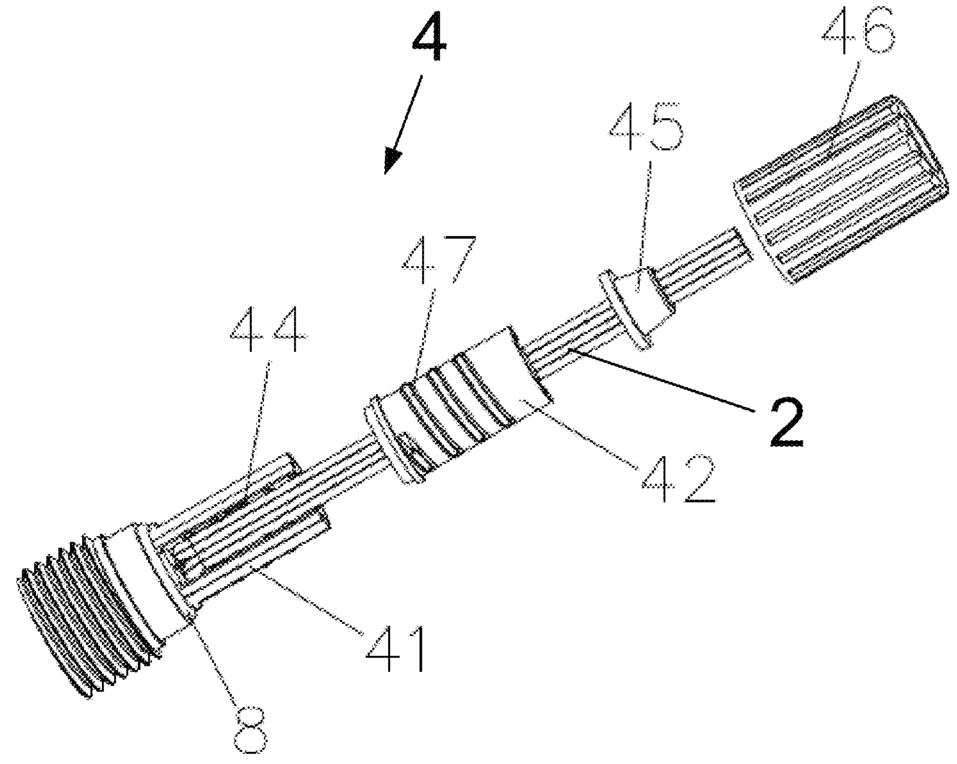
FIG. 3 is a schematic diagram of an exploded structure of a female connector of the present disclosure.
Figure 4:
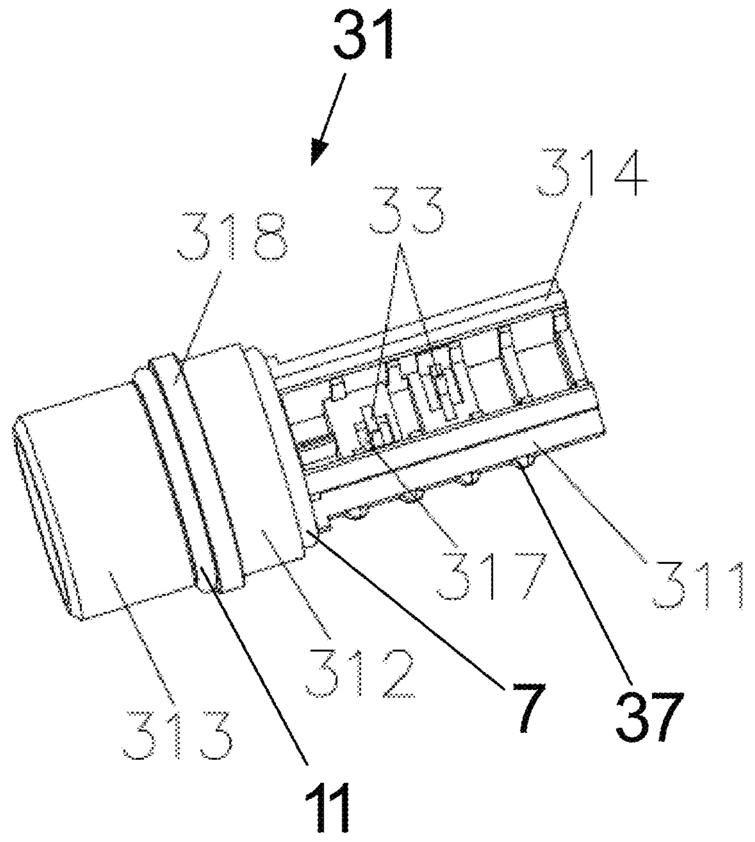
FIG. 4 is a schematic structural diagram of a first assembly part of the present disclosure.
Figure 5:
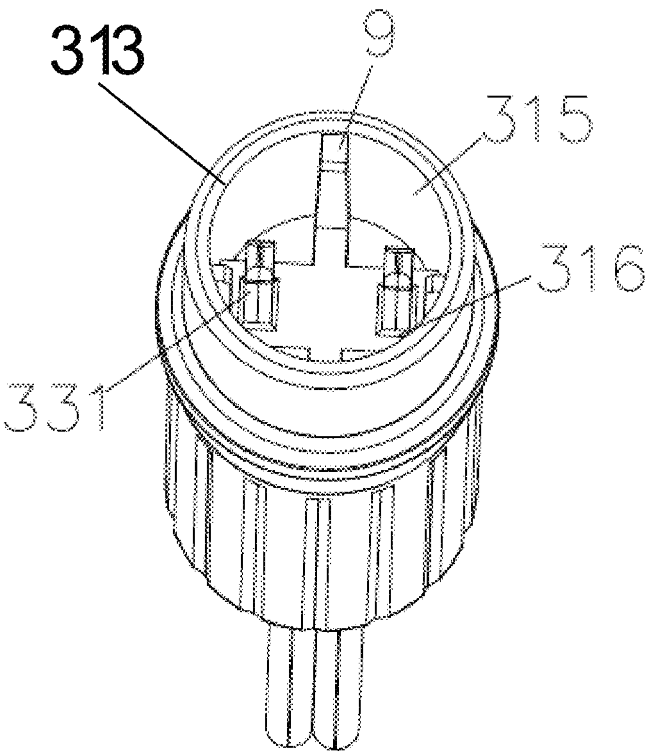
FIG. 5 is a schematic diagram of an internal structure of a first cylindrical portion of the present disclosure.
Figure 6:
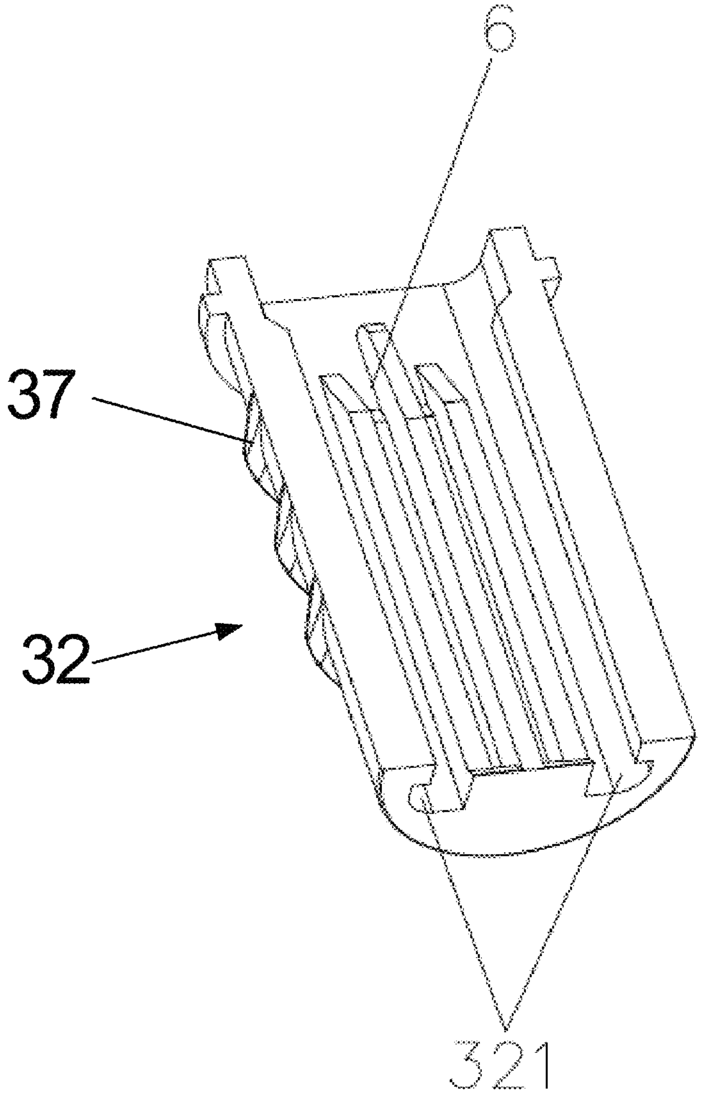
FIG. 6 is a schematic structural diagram of a second assembly part of the present disclosure.
Figure 7:
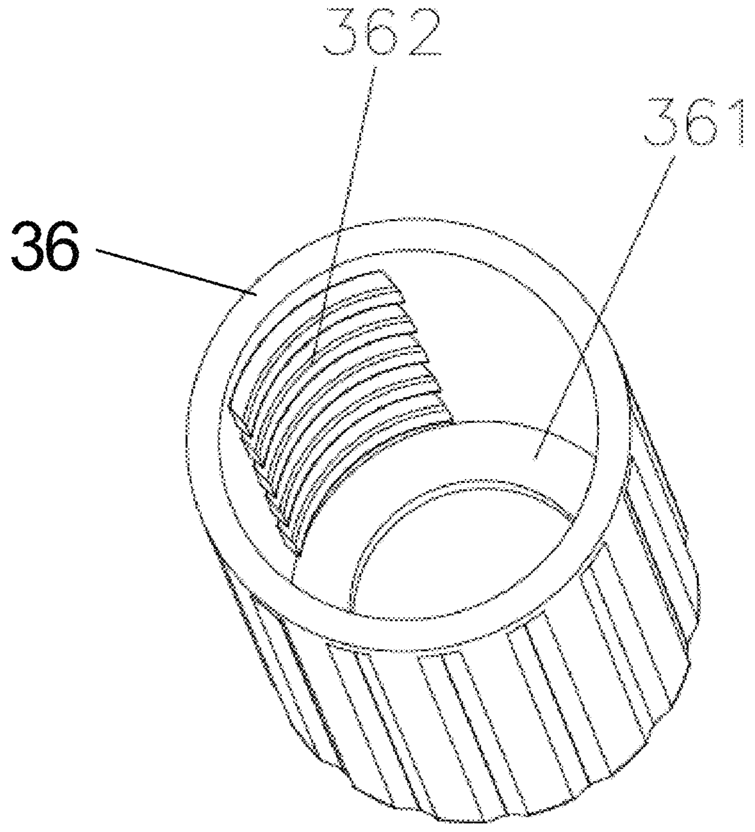
FIG. 7 is a schematic structural diagram of a first protective shell of the present disclosure.
Figure 8:
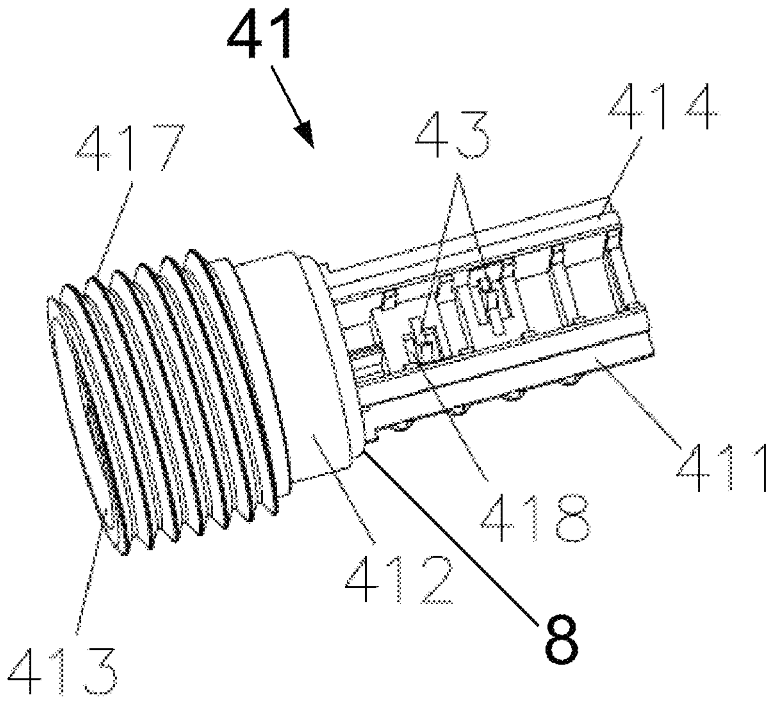
FIG. 8 is a schematic structural diagram of a third assembly part of the present disclosure.
Figure 9:
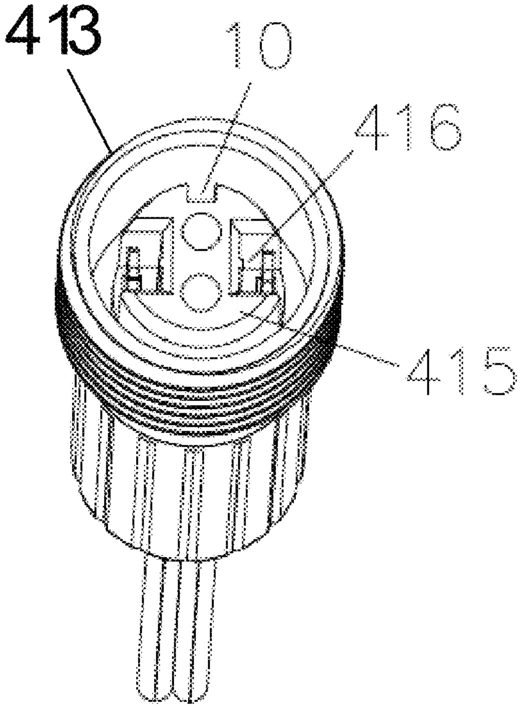
FIG. 9 is a schematic diagram of an internal structure of a second cylindrical portion of the present disclosure.
Figure 10:
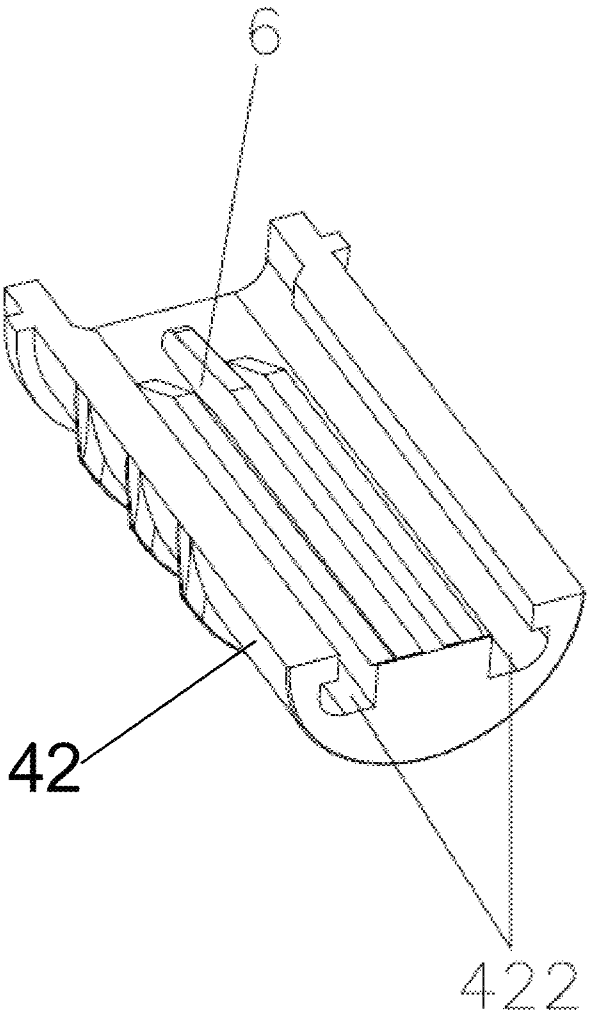
FIG. 10 is a schematic structural diagram of a fourth assembly part of the present disclosure.
Figure 11:
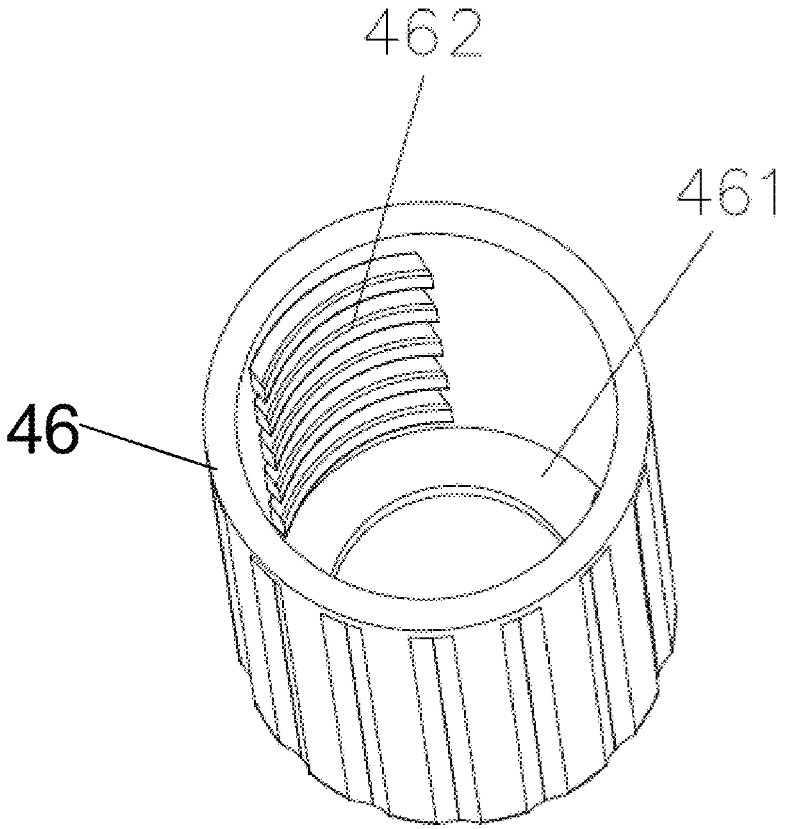
FIG. 11 is a schematic structural diagram of a second protective shell of the present disclosure.
Figure 12:
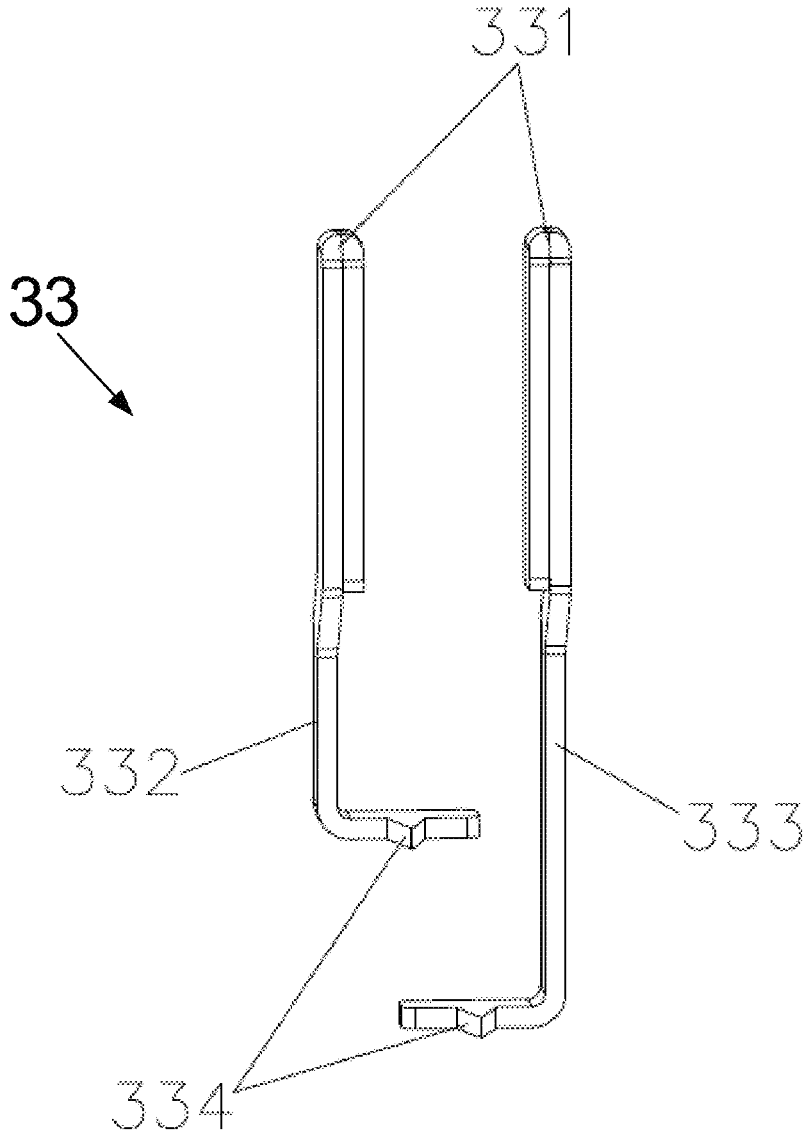
FIG. 12 is a schematic structural diagram of a first conductive terminal of the present disclosure.
Figure 13:
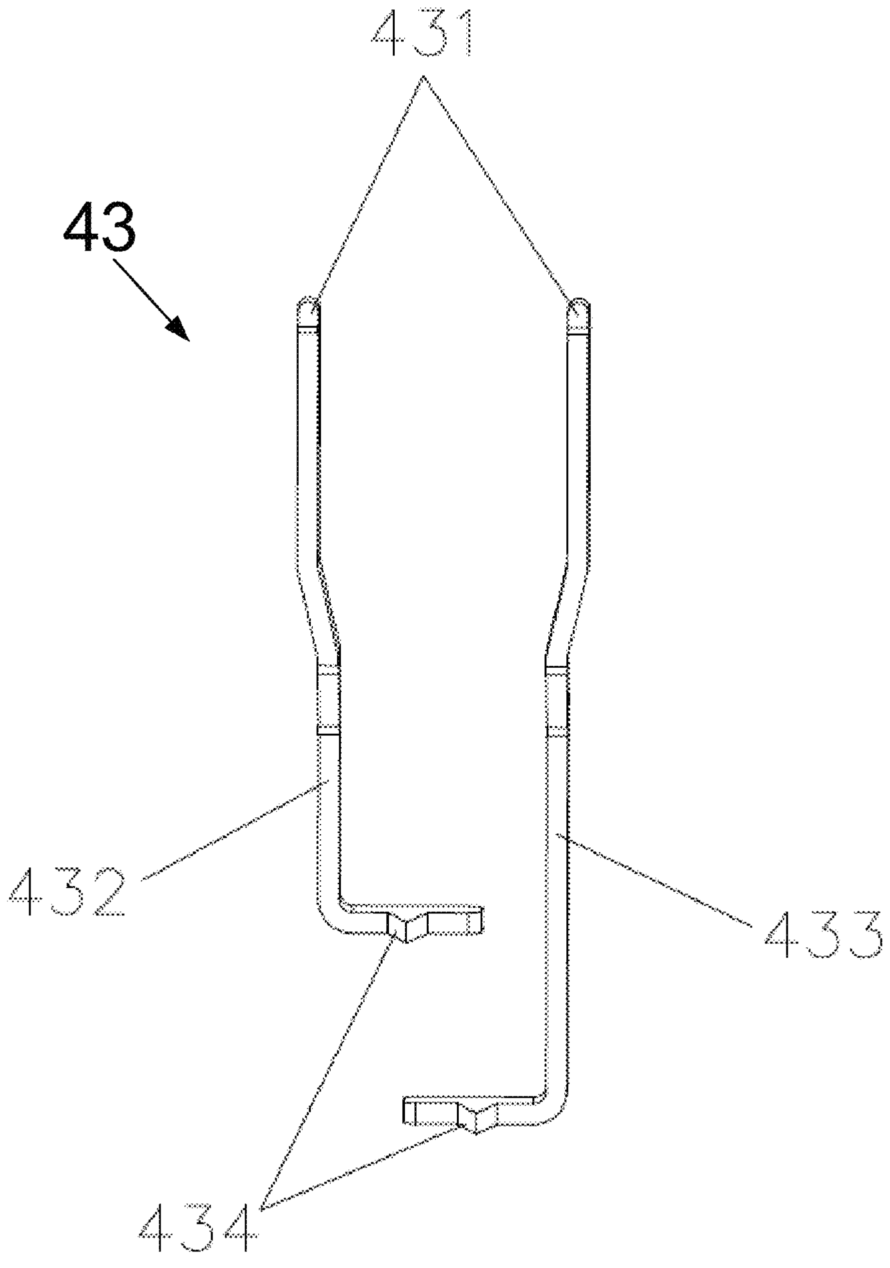
FIG. 13 is a schematic structural diagram of a second conductive terminal of the present disclosure.

The present disclosure is described in detail below in combination of FIG. 1-FIG. 13.

The present disclosure provides an assembled type waterproof male and female plug for string light connection, including a first electrical wire 1 and a second electrical wire 2. The electrical wires are double-core wires. The first electrical wire 1 is provided with a male connector 3. The second electrical wire 2 is provided with a female connector 4. The male connector 3 and the female connector 4 can be plugged to each other. The male connector 3 includes a first assembly part 31 and a second assembly part 32. The first assembly part 31 is provided with a first conductive terminal group 33. The first conductive terminal group 33 is provided with at least two plugging ends 331 for connecting the female connector 4. The first assembly part 31 and the second assembly part 32 are spliced with each other to form a first cavity 34. The first electrical wire 1 extends into the first cavity 34. The first electrical wire 1 is electrically connected to the first conductive terminal group 33. The female connector 4 includes a third assembly part 41 and a fourth assembly part 42. The third assembly part 41 is provided with a second conductive terminal group 43. The second conductive terminal group 43 is provided with contact ends 431 electrically connected to the plugging ends 331. The third assembly part 41 and the fourth assembly part 42 are spliced with each other to form a second cavity 44. The second electrical wire 2 extends into the second cavity 44. The second electrical wire 2 is electrically connected with the second conductive terminal group 43. The present disclosure is mainly applied to connection between string lights. Steps for assembling the male connector 3 includes: electrically connecting the first electrical wire 1 to the first conductive terminal group 33 inside the first assembly part 31, and then splicing the second assembly part 32 and the first assembly part 31 to complete the assembling. Steps for assembling the female connector 4 includes: electrically connecting the second electrical wire 2 to the second conductive terminal group 43 inside the third assembly part 41, and then splicing the fourth assembly 42 and the third assembly part 41 to complete the assembling. The male connector 3 and the female connector 4 can be plugged to each other for use after assembling. In order to further improve the stability of assembling, wire slots 6 are formed inside the second assembly part 32 and the fourth assembly part 42, and are used for placing the electrical wires to prevent the wires from moving in a use process. Compared with a traditional male and female plug, the present disclosure has the following advantages: 1. The male and female plug is of an assembled type structure, so that it is not necessary to use specific injection molding equipment to produce male and female plugs, which simplifies the production flow and effectively reduces the production cost. 2. The male and female plug is high in waterproof performance, which greatly improves the safety and stability of a product. 3. The male and female plug is simple in structure and high in assembling efficiency, can be assembled manually or automatically on a large scale, without being limited by environments, and is more convenient to use.

Preferably, first sealing members 35 are arranged at end portions of the first assembly part 31 and the second assembly part 32. The first sealing members 35 can prevent external water from entering the first assembly part 31 and the second assembly part 32, to overall improve the waterproof performance of the male connector 3. During assembling, the first sealing members 35 are first sleeved into a wire. The first sealing members 35 are sleeved after the first assembly part 31 and the second assembly 32 are assembled. On the other hand, a first protective shell 36 further sleeves the first assembly part 31 and the second assembly part 32. A first annular platform portion 361 for fixing the first sealing members 35 is arranged at a bottom of the first protective shell 36. After the first sealing members 35 assembled, the first protective shell is sleeved from one ends of the first sealing members 35. The first annular platform portion 361 resists against the first sealing members 35. Therefore, the first protective shell 36 further has a function of fixing the first sealing members 35.

In this technical solution, a plurality of first protrusions 37 are arranged outside each of the first assembly part 31 and the second assembly part 32. A plurality of second protrusions 362 are arranged inside the first protective shell 36. The first protrusions 37 and the second protrusions 362 are clamped to each other. The first protective shell 36 is connected to the first assembly part 31 and the second assembly part 32 in a clamped manner, so that the structure is simple and the assembling is convenient.

As another embodiment, second sealing members 45 are arranged at end portions of the third assembly part 41 and the fourth assembly part 42. A second protective shell 46 further sleeves the third assembly part 41 and the fourth assembly part 42. A second annular platform portion 461 for fixing the second sealing members 45 is arranged at a bottom of the second protective shell 46. The function of the second sealing members 45 is the same as the function of the first sealing members 35, and the function of the second protective shell 46 is also the same as the function of the first protective shell 36.

On the other hand, a plurality of third protrusions 47 are arranged outside each of the third assembly part 41 and the fourth assembly part 42. A plurality of fourth protrusions 462 are arranged inside the second protective shell 46. The third protrusions 47 and the fourth protrusions 462 are clamped to each other. The second protective shell 46 is connected to the third assembly part 41 and the fourth assembly part 42 in a clamped manner, so that the structure is simple and the assembling is convenient.

In the present disclosure, the first assembly part 31 includes a first assembling portion 311, a first connecting portion 312 and a first cylindrical portion 313 which are connected in sequence. First clamping portions 314 are arranged on two sides of the first assembling portion 311. The second assembly part 32 is provided with first buckling portions 321 clamped to the first clamping portions 314. During assembling, the first buckling positions 321 on the second assembly part 32 are aligned with the first clamping portions 314 and are pushed forward from an end of the first assembling portion 311. The first assembly part 31 and the second assembly part 32 are spliced, so that the structure is simple, and the assembling is convenient. The first cylindrical portion 313 is provided with an accommodating chamber 315. Limiting holes 316 for mounting the plugging ends 331 are formed inside the accommodating chamber 315. The limiting holes 316 are used for limiting positions of the plugging ends 331, to realize a locating function. In this technical solution, a first waterproof ring 7 is arranged between the first assembling portion 311 and the first connecting portion 312. The second assembly part 32 is only matched with the first assembling portion 311. After assembling, there may be a space between the position of the second assembly part 32 and the position of the first connecting portion 312. Therefore, the inventor has designed the first waterproof ring 7 here to prevent water from entering the first cavity 34, to prolong the service life of a product.

As one embodiment, the first conductive terminal group 33 includes a first conductive terminal 332 and a second conductive terminal 333. One end of each of the first conductive terminal 332 and the second conductive terminal 333 is provided with a first pointed convex portion 334 for being electrically connected to the first electrical wire 1. The first pointed convex portion 334 is arranged at the first assembly part 311. In order to better locate the first pointed convex portions 334, first locating slots 317 for locating the first pointed convex portions 334 are arranged inside the first assembling portion 311. In this technical solution, the first pointed convex portion 334 of the first conductive terminal 332 punctures through one core of the first electrical wire 1 and is used as a positive electrode of a loop. The first pointed convex portion 334 of the second conductive terminal 333 punctures through the other core of the first electrical wire 1 and is used as a negative electrode of the loop, to ensure that a circuit can be used normally. Plugging ends 331 are arranged at the other ends of the first conductive terminal 332 and the second conductive terminal 333. The plugging ends 331 pass through the first connecting portion 312 and are mounted in the limiting holes 316. As mentioned above, the plugging end 331 of the first conductive terminal 332 is used as a positive electrode, and the plugging end 331 of the second conductive terminal 333 is used as a negative electrode.

In this technical solution, the third assembly part 41 includes a second assembling portion 411, a second connecting portion 412 and a second cylindrical portion 413 which are connected in sequence. Second clamping portions 414 are arranged on two sides of the second assembling portion 411. The fourth assembly part 42 is provided with second buckling portions 422 clamped to the second clamping portions 414. During assembling, the second buckling positions 422 on the fourth assembly part 42 are aligned with the second clamping portions 414 and are pushed forward from an end of the second assembling portion 411. The third assembly part 41 and the fourth assembly part 42 are spliced, so that the structure is simple, and the assembling is convenient. The second cylindrical portion 413 is internally provided with a mounting portion 415 matched with the accommodating chamber 315. Mounting holes 416 for mounting the plugging ends 431 are formed in the mounting portion 415. When the female connector 4 and the male connector 3 are plugged to each other, the entire first cylindrical portion 313 is plugged into the second cylindrical portion 413, and the entire mounting portion 415 of the second cylindrical portion 413 is plugged into the accommodating chamber 315 of the first cylindrical portion 313.

The two plugging ends 331 are respectively plugged to the mounting holes 416, and finally the plugging ends 331 are electrically connected to the contact ends 431, to turn on the circuit. Similarly, a second waterproof ring 8 is arranged between the second assembling portion 411 and the second connecting portion 412. The fourth assembly part 42 is only matched with the second assembling portion 411. After assembling, there may be a space between the position of the fourth assembly part 42 and the position of the second connecting portion 412. Therefore, the inventor has designed the second waterproof ring 8 here to prevent water from entering the second cavity 44, to prolong the service life of a product.

As another embodiment, the second conductive terminal group 43 includes a third conductive terminal 432 and a fourth conductive terminal 433. One end of each of the third conductive terminal 432 and the fourth conductive terminal 433 is provided with a second pointed convex portion 434 for being electrically connected to the second electrical wire 2. The second pointed convex portion 434 is arranged at the second assembly part 411. Second locating slots 418 for mounting the second pointed convex portions 434 are correspondingly arranged inside the second assembling portion 411. The other end of each of the third conductive terminal 432 and the fourth conductive terminal 433 is provided with each contact end 431. The contact ends 431 pass through the second connecting portion 412 and are mounted in the mounting holes 416. After the male connector 3 and the female connector 4 are plugged, the plugging ends 331 of the male connector 3 and the contact ends 431 of the female connector 4 resist against each other to form an electrical loop. Because a circuit needs to strictly distinguish positive and negative electrodes, the inventor has designed a locating block 9 inside the containment chamber 315. The mounting portion 415 of the second cylindrical portion 413 is correspondingly provided with third locating slots 10. When the male connector 3 and the female connector 4 are plugged, the locating block 9 can be used to quickly distinguish the positive and negative electrodes of the circuit, to prevent a short circuit caused by reverse connection of the positive and negative electrodes.

Preferably, the assembled waterproof male and female plug for lamp string connection further includes a locking nut 5 for fixedly connecting the male connector 3 to the female connector 4. A locking thread 417 is formed outside the second cylindrical portion 413. The locking thread 417 is in threaded connection with the locking nut 5. One end of the locking nut 5 is provided with a third annular platform portion 51. When in use, after the male connector 3 is connected to the female connector 4, the locking nut 5 is sleeved from one end of the male connector 3, so that the third annular platform portion 51 resists against the annular clamping portion 318 arranged outside the first connecting portion 312, and finally the locking nut 5 is in threaded connection with the locking thread 417 on the second cylindrical portion 413, to further strengthen the connection between the male connector 3 and the female connector 4. At the same time, in order to further improve the waterproof function of the male and female plug, a sealing ring 11 is arranged between the first cylindrical portion 313 and the first connecting portion 312.

The above contents are only preferred embodiments of the present disclosure. Those of ordinary skill in the art can make changes to the specific implementations and application scopes according to the idea of the present disclosure, and the contents of this specification shall not be understood as restrictions to the present disclosure.

What is claimed is:

1. An assembled type waterproof male and female plug for string light connection, comprising a first electrical wire (1) and a second electrical wire (2), wherein the first electrical wire (1) is provided with a male connector (3); the second electrical wire (2) is provided with a female connector (4); the male connector (3) and the female connector (4) are configured to be plugged to each other;

the male connector (3) comprises a first assembly part (31), a second assembly part (32), a first sealing member (35) and a first protective shell (36); wherein the first assembly part (31) is provided with a first conductive terminal group (33); the first conductive terminal group (33) is provided with at least two plugging ends (331) for connecting the female connector (4); the first assembly part (31) and the second assembly part (32) are opposite to and spliced with each other to form a first cavity (34); the first electrical wire (1) extends into the first cavity (34) and is electrically connected to the first conductive terminal group (33); the first sealing member (35) is arranged at end portions of the first assembly part (31) and the second assembly part (32), and configured to prevent external water from entering the first cavity (34) through gap between the end portions of the first assembly part (31) and the second assembly part (32); the first protective shell (36) is configured to sleeve the first assembly part (31) and the second assembly part (32) together; and a bottom of the first protective shell (36) is provided with a first annular platform portion (361) for fixing the first sealing members (35) to the end portions of the first assembly part (31) and the second assembly part (32);

the female connector (4) comprises a third assembly part (41), a fourth assembly part (42), a second sealing member and a second protective shell (46); wherein the third assembly part (41) is provided with a second conductive terminal group (43); the second conductive terminal group (43) is provided with contact ends (431) electrically connected to the plugging ends (331); the third assembly part (41) and the fourth assembly part (42) are opposite to and spliced with each other to form a second cavity (44); the second electrical wire (2) extends into the second cavity (44); and the second electrical wire (2) is electrically connected with the second conductive terminal group (43); the second sealing member (45) is arranged at end portions of the third assembly part (41) and the fourth assembly part (42), and configured to prevent external water from entering the second cavity 44 through gab between the end portions of the third assembly part (41) and the fourth assembly part (42); the second protective shell (46) is configured to sleeve the third assembly part (41) and the fourth assembly part (42) together; and a bottom of the second protective shell (46) is provided with a second annular platform portion (461) for fixing the second sealing members (45) to the end portions of the third assembly part (41) and the fourth assembly part (42).

2. The assembled type waterproof male and female plug for string light connection according to claim 1, wherein a plurality of first protrusions (37) are arranged outside each of the first assembly part (31) and the second assembly part (32); a plurality of second protrusions (362) are arranged inside the first protective shell (36); and the first protrusions (37) and the second protrusions (362) are clamped to each other.

3. The assembled type waterproof male and female plug for string light connection according to claim 1, wherein a plurality of third protrusions (47) are arranged outside each of the third assembly part (41) and the fourth assembly part (42); a plurality of fourth protrusions (462) are arranged inside the second protective shell (46); and the third protrusions (47) and the fourth protrusions (462) are clamped to each other.

4. The assembled type waterproof male and female plug for string light connection according to claim 1, wherein the first assembly part (31) comprises a first assembling portion (311), a first connecting portion (312) and a first cylindrical portion (313) which are connected in sequence; two sides of the first assembling portion (311) are provided with first clamping portions (314); the second assembly part (32) is provided with first buckling portions (321) that is configured to be clamped to the first clamping portions (314), to splice the first assembly part (31) and the second assembly part (32) together; the first cylindrical portion (313) is provided with an accommodating chamber (315); wherein the accommodating chamber (315) is provided with limiting holes (316) for mounting the plugging ends (331).

5. The assembled type waterproof male and female plug for string light connection according to claim 4, wherein the first conductive terminal group (33) comprises a first conductive terminal (332) and a second conductive terminal (333); one end of each of the first conductive terminal (332) and the second conductive terminal (333) is provided with a first pointed convex portion (334) for being electrically connected to the first electrical wire (1); the first pointed convex portion (334) is arranged at the first assembly part (311); the other end of each of the first conductive terminal (332) and the second conductive terminal (333) is provided with each plugging end (331); and the plugging ends (331) pass through the first connecting portion (312) and are mounted in the limiting holes (316).

6. The assembled type waterproof male and female plug for string light connection according to claim 1, wherein the third assembly part (41) comprises a second assembling portion (411), a second connecting portion (412) and a second cylindrical portion (413) which are connected in sequence; two sides of the second assembling portion (411) are provided with second clamping portions (414); the fourth assembly part (42) is provided with second buckling portions (422) that is configured to be clamped to the second clamping portions (414), to splice the third assembly part (41) and the fourth assembly part (42) together; the second cylindrical portion (413) is internally provided with a mounting portion (415) matched with the accommodating chamber (315); wherein the mounting portion (415) is provided with mounting holes (416) for mounting the plugging ends (431).

7. The assembled type waterproof male and female plug for string light connection according to claim 6, wherein the second conductive terminal group (43) comprises a third conductive terminal (432) and a fourth conductive terminal (433); one end of each of the third conductive terminal (432) and the fourth conductive terminal (433) is provided with a second pointed convex portion (434) for being electrically connected to the second electrical wire (2); the second pointed convex portion (434) is arranged at the second assembly part (411); the other end of each of the third conductive terminal (432) and the fourth conductive terminal (433) is provided with each contact end (431); and the contact ends (431) pass through the second connecting portion (412) and are mounted in the mounting holes (416).

8. The assembled waterproof male and female plug for lamp string connection according to claim 4, further comprising a locking nut (5) configured to be movable sleeved on the male connector (3), wherein one end of the locking nut (5) is provided with a third annular platform portion (51);

an outer surface of the first connecting portion (312) is provided with an annular clamping portion (318), wherein the clamping portion (318) is configured to serve as a stop for the third annular platform portion (51), so as to limit the locking nut (5) on the male connector (3);

the third assembly part (41) comprises a second cylindrical portion (413), wherein the second cylindrical portion (413) is internally provided with a mounting portion (415) matched with the accommodating chamber (315); wherein the mounting portion (415) is provided with mounting holes (416) for mounting the plugging ends (431); an outer surface of the second cylindrical portion (413) is provided with a locking thread (417) that is configured to be in threaded connection with the locking nut (5), to strengthen the connection between the male connector (3) to the female connector (4).

9. The assembled waterproof male and female plug for lamp string connection according to claim 4, wherein the male connector (3) further comprises a first waterproof ring (7) arranged between the first assembling portion (311) and the first connecting portion (312), wherein the first waterproof ring (7) is configured to prevent water from entering the first cavity (34) from a space between an other end portion of the second assembly part (32) and an end portion of the first connecting portion (312).

10. The assembled waterproof male and female plug for lamp string connection according to claim 6, wherein the female connector (4) further comprises a second waterproof ring (8) arranged between the second assembling portion (411) and the second connecting portion (412), wherein the second waterproof ring (8) is configured to prevent water from entering the second cavity (44) from a space between an other end portion of the fourth assembly part (42) and an end portion of the second connecting portion (412).

11. The assembled waterproof male and female plug for lamp string connection according to claim 4, wherein the accommodating chamber (315) is provided with a locating block (9); the third assembly part (41) comprises a second cylindrical portion (413), wherein the second cylindrical portion (413) is internally provided with a mounting portion (415) matched with the accommodating chamber (315); wherein the mounting portion (415) is provided with mounting holes (416) for mounting the plugging ends (431) and a third locating slot (10) corresponding to the locating block (9); wherein the locating block (9) is configured to be plugged into the third locating slot (10) when the male connector (3) and the female connector (4) are plugged together, to prevent a reverse connection of the male connector (3) and the female connector (4).

* * * * *